L. W. HOLUB & P. F. DUSHA.
BUTTON BLANK CUTTING MACHINE.
APPLICATION FILED JUNE 6, 1910.
999,032.
Patented July 25, 1911.
2 SHEETS—SHEET 2.
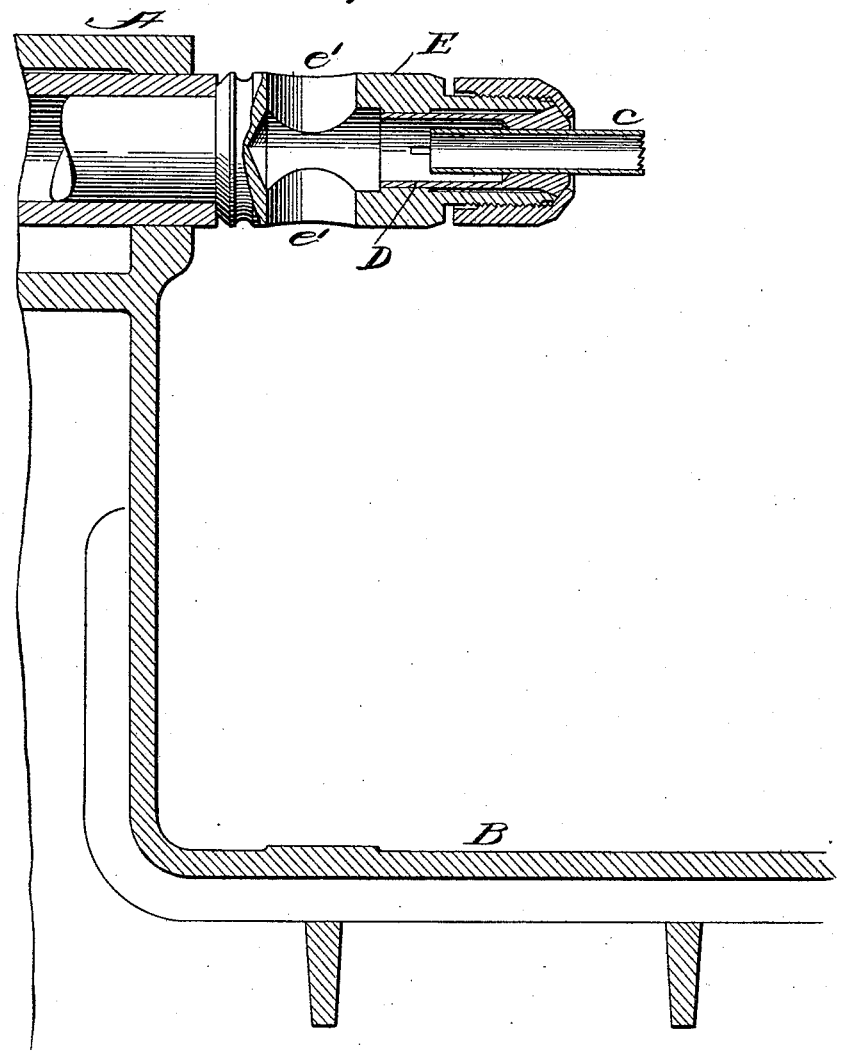
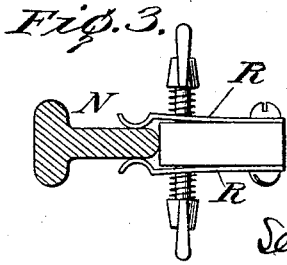

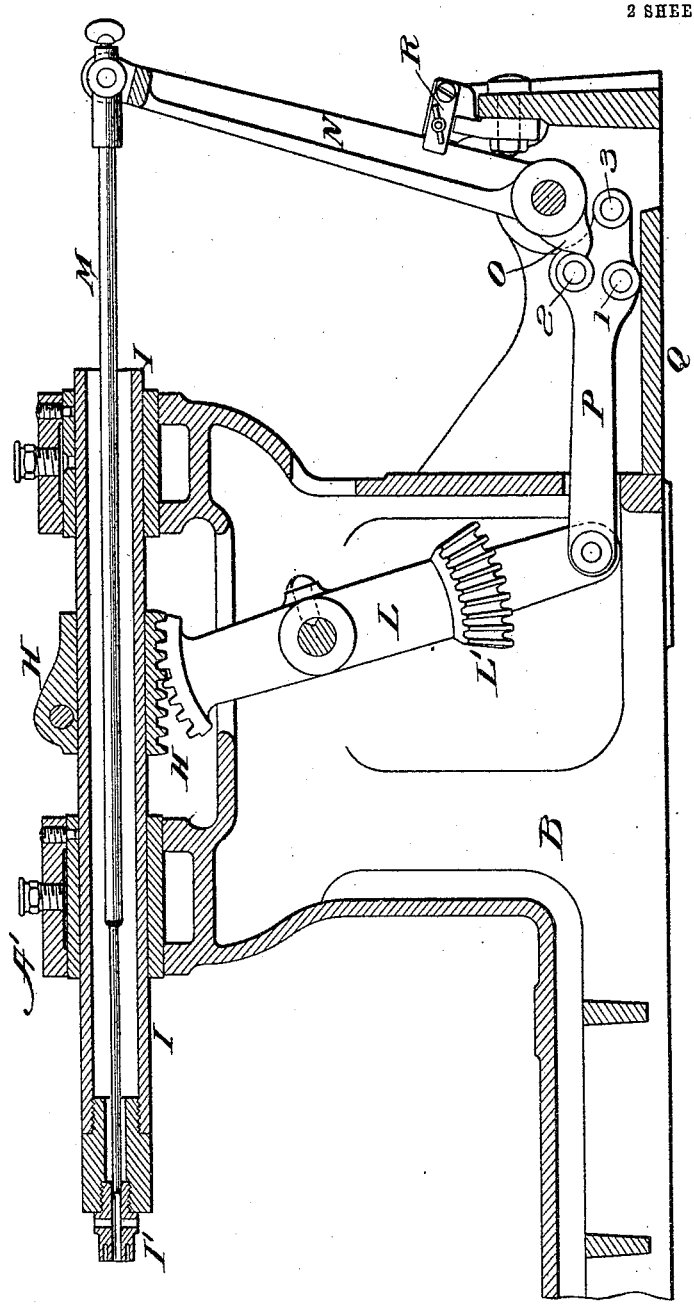

UNITED STATES PATENT OFFICE.

LOUIS W. HOLUB AND PAUL F. DUSHA, OF NEW YORK, N. Y., ASSIGNORS TO HOLUB-DUSHA COMPANY, OF SARATOGA SPRINGS, NEW YORK, A CORPORATION OF NEW YORK.

BUTTON-BLANK-CUTTING MACHINE.

999,032.     Specification of Letters Patent.   Patented July 25, 1911.

Application filed June 6, 1910. Serial No. 565,228.

*To all whom it may concern:*

Be it known that we, LOUIS W. HOLUB and PAUL F. DUSHA, citizens of the United States, and residents of the city, county, and State of New York, have jointly invented certain new and useful Improvements in Button-Blank-Cutting Machines, of which the following is a specification.

Our invention relates to improvements in button blank cutting machines in which a tubular rotating cutter operates in conjunction with the support and a simplified and more efficient blank knockout device and its coöperating spring stop, and the objects of our improvement are: 1st. To provide a knockout device which will eject each button blank as soon as it is cut, from the circular cutting tool, into a receptacle separate from the chips, dust and dirt resulting from the cutting. 2nd. To simplify the knockout device and to bring it into action at the instant the cutting of the blank is complete, in a way to deliver a light blow upon the button blank instead of operating defectively by a dead push. 3rd. To make the knockout device operative from the working lever of the machine by a slight further movement beyond that required for moving the support toward the cutting tool. 4th. To provide intermittent action for the knockout device, with minimum wear and simplicity of construction. 5th. To give the knockout rod a long travel with a slight movement of the hand lever and a positive movement without the use of springs, and to bring the knockout rod back into its first position by positive movement, and to provide a cushion rest for the backward movement and a detaining force at the beginning of the forward movement.

Other objects will appear from the hereinafter description.

We attain these objects by the construction illustrated in the accompanying drawings, in which—

Figure 1 is a side view of the knockout mechanism, with the coöperating parts of the machine, with parts in section; Fig. 2 is a side view of the head stock and cutting tool with parts in section; Fig. 3 is a plan view of the spring stop holding in the position of rest the arm of the knockout mechanism shown in section.

A is the headstock, and A' is the tailstock, of a button blank cutting machine, both preferably formed integral with the bed-piece B.

C is a tubular cutting tool held by the spring chuck D fitting in the end of the hollow spindle E, in which it is pressed by the nut F. Holes in the spindle E are lettered *e' e'*.

H is a clamp on the reciprocating bar I giving an adjustable motion thereon.

I is a hollow reciprocating bar carrying the hollow support I', against which the shell to be cut is backed, and by the advancing motion of the reciprocating bar I the shell is pressed against the cutting tool C when the button blank is being cut.

L is a gear lever pivoted to the tailstock A', meshing at the upper end in the teeth of the clamp H, by which the clamp and reciprocating bar I are advanced and withdrawn when the gear lever L is moved one way or the other. A horizontal hand lever, not shown, toothed at the inner end, meshing with the teeth L' on the gear lever L, actuates the gear lever L and through that the reciprocating bar I.

The foregoing are the well-known parts of a button blank cutting machine, and associated with these are our improved knockout rod and its operating mechanism.

The knockout rod M is within the reciprocating bar I and rests in the hollow support I', and at the outer end is pivoted to the upright lever N, pivoted at its lower end to the bed-piece of the machine and bearing integral therewith the cam O, by which the lever N is actuated which in turn actuates the knockout rod M.

The bar P is pivoted at the lower end of the gear lever L and bears at the other end three rollers, 1, 2, 3, of which the roller 1 supports the bar P on the bed-piece Q. The roller 2 is so placed that it contacts with the cam O when the cutting tool C has cut through the meat of the shell and is about to cut the rough softer outside part of the shell. After the cam O has been moved by the roller 2 to the right, giving the arm N and the knockout rod M a long throw, the cam O is in position to contact also with the roller 3 without lost motion. At that point the upper end of the arm N and the knockout rod M have reached their extreme motion to the right and have come to rest. The reverse motion of the hand lever, not shown, actuating the lever L, and with it the bar P, returns all the parts to the position shown in the drawing by the movement of the roller 3 on the cam O by a positive movement, without the connection of springs. The arm N is preferably shaped as in the cross section shown in Fig. 2, so that its web may be clasped between the members of the flat spring R and thereby brought to a soft rest by the tension of the spring.

The operation of our improved machine is as follows: The space between the cutting tool C and the support I is such as to receive the shell to be cut in button blanks, and thereupon by the hand lever of the machine not shown the gear lever is moved so as to move the reciprocating bar I bearing the support I' toward the revolving cutting tool, and a blank is thereby cut, with the appropriate pressure communicated by the hand lever until the outer soft part of the shell which is against the support I' is reached, whereupon the pressure for the best results must be less, or the cutting tool will break through the soft flaky outside part of the shell and split off material which goes to waste, and also may make a defective button blank.

Unskilled labor is not adequate to this time release of pressure, and our improved machine accomplishes this in a special way with certainty. When this point is reached the cam O is in contact with the roller 2 and is about to move the arm N to bring the knockout rod M into play; but the hand pressure on the working lever is now required to pull the lever M out from the clasp of the spring R, and while this is being done the pressure on the support I' against the shell is less. At this point the cutting through the soft flaky outside part of the shell is being done.

The cam device on the lever N gives the lever N and the knockout rod an intimate motion, a quick long throw of the knockout rod, which delivers a light tap to the button blank which is cut out, located within, and at the cutting end of the tubular cutting tool C the blank is thus ejected from the cutting tool and followed up by the knockout rod until it reaches the holes e' e' in the hollow spindle E, through which the button blank passes to the proper receptacle, separate from the dust and chips of the cutting tool some distance away.

A hood, not shown, may be provided around the hollow spindle E to direct the button blanks into the receptacle. By the reverse motion of the hand lever not shown, the knockout mechanism is brought to the position shown in the drawings and a new cutting proceeds.

The movements of the machine are rapid, and it will be seen that our improvements accomplish all the objects hereinbefore recited and enable us to avoid the use of springs to return the knockout rod to its first position, the tension of which must be overcome by the hand of the operator, with gradually increased fatigue when the thousands of movements a day are considered. The principal moving parts of our knockout device are roller movements. The bearing surfaces around the knockout rod are only such as are required to support and guide it. Its movements are all positive; there is no lost motion; the rest is cushioned; and by the slight blow in place of a push on the button blank delivered by the knockout, the muscular effort of the operator is economized.

Other mechanical equivalents for the quick intermittent motion of the knockout rod may be employed, and we have constructed most of them, but the construction given is best.

The knockout device may be arranged on the other side of the machine in the hollow spindle and tubular cutting tool to eject the button blank in the opposite direction or through the hollow support.

Having now described our invention, what we claim as new and desire to secure by Letters Patent is:

In a button blank cutting machine, a knockout device comprising a knockout rod, an actuating arm, means for giving it intermittent motion adapted to give it quick movement at the instant of contact with the button blank, and means for cushioning the movement of the knockout device at the beginning and at the end of every cycle.

In witness whereof, we have hereunto set our hands, at the city, county and State of New York, this third day of June, 1910.

LOUIS W. HOLUB.
PAUL F. DUSHA.

In presence of—
LYDIA M. NEKARDA,
JOHN J. RANAGAN.

---

Copies of this patent may be obtained for five cents each, by addressing the "Commissioner of Patents, Washington, D. C."